United States Patent [19]

Winthrop et al.

[11] Patent Number: 4,942,696

[45] Date of Patent: Jul. 24, 1990

[54] BLOCKING SHIM AND METHOD FOR PRESCRIPTION-LABORATORY PROCESSING OF ASPHERIC PROGRESSIVE-ADDITION LENSES

[75] Inventors: John T. Winthrop, Wellesley; Alexander F. Menyhart, Brimfield; James Duszlak, Dudley, all of Mass.

[73] Assignee: American Optical Corporation, Southbridge, Mass.

[21] Appl. No.: 204,567

[22] Filed: Jun. 9, 1988

[51] Int. Cl.$^5$ ............................. B24B 13/005
[52] U.S. Cl. ...................... 51/277; 51/216 LP; 51/284 R; 33/28
[58] Field of Search ............... 51/277, 216 LP, 284 R; 33/28

[56] References Cited

U.S. PATENT DOCUMENTS

| | | | |
|---|---|---|---|
| Re. 31,897 | 5/1985 | Johnson | 51/216 LP |
| 2,166,037 | 7/1939 | Campos | 51/277 |
| 3,140,568 | 7/1964 | Beasley | 51/277 |
| 4,227,349 | 10/1980 | Bicskei | 51/277 |

Primary Examiner—Robert Rose
Attorney, Agent, or Firm—Fishman, Dionne & Cantor

[57] ABSTRACT

A thin sheet of flexible material shaped like an inverted "T", is applied to the aspheric distance portion of a progressive-addition ophthalmic lens, to provide stable three-point contact for blocking the lens prior to second-side surfacing in the prescription laboratory.

12 Claims, 2 Drawing Sheets

BLOCKING SHIM AND METHOD FOR PRESCRIPTION-LABORATORY PROCESSING OF ASPHERIC PROGRESSIVE-ADDITION LENSES

BACKGROUND OF THE INVENTION

This invention relates to the field of opthalmic lenses. More particularly, this invention relates to apparatus and a method for use in blocking lenses for machine processing of lenses.

Presbyopia is the loss of accommodation of the eye with age. It is classically treated by means of bifocal or trifocal spectacle lenses. Progressive lenses are the modern alternative to bifocal and trifocal lenses. Progressive lenses provide a continuous gradient of optical powers, ranging from the power required for viewing distant objects to that required for near objects. Because of the unbroken visual field provided by such lenses, many patients consider progressive lenses to be optically superior to the bifocal or trifocal lenses. Moreover, because of the absence of visible dividing lines, progressive lenses offer a distinct cosmetic advantage over conventional multifocals.

The progressive surface of a progressive lens ordinarily comprises the convex side of the lens. The spherocylindrical surface required to accommodate the patient's prescription is ground into the concave side of the lens. The generating, grinding, and polishing of the concave surface is a standard processing operation of the ophthalmic prescription laboratory.

Before the concave side of a lens can be surfaced, the lens must undergo a "blocking" operation. The operation consists of mounting a molded metal disk, or "block", on the convex side of the lens. The block provides an accurate mechanical reference surface for holding the lens in the chuck of the lens curve generator.

Typically the block consists of a low melting point alloy which is molded to shape directly against the convex surface of the lens to be blocked. The molding operation requires that the lens be held accurately against a reference ring, inside of which the melted alloy is poured and eventually solidifies.

Geometrically, the reference ring is a hollow right circular cylinder. When a progressive lens is blocked, the lens is placed against the blocking ring in such a way that only the distance portion of the lens actually makes contact with the inside edge of the ring. The reading half of the lens does not make contact with the ring. If the distance portion of the progressive side of the lens is essentially spherical, then accurate seating of the lens against the blocking ring is assured, and the lens may be blocked exactly as if the lens were an ordinary bifocal or trifocal. If, however, the distance Portion is aspherical, as is the case in the most advanced progressive-lens designs, then the lens may rock when placed against the blocking ring, and accurate seating against the ring becomes problematical. This can result in improper blocking and, subsequently, an improper generating operation leading to unwanted prism at the distance fitting center.

Invariably, when the distance portion of a progressive lens is aspherical, the asphericity is such that the average curvature in a horizontal merdian through the distance fitting center is greater than the average curvature in the distance portion half of a vertical merdian through the fitting center. That is, the distance portion of the progressive surface is slightly egg-shaped, the axis of the egg being vertical. It is clear that a surface of this shape cannot be mated to the end of a hollow right circular cylinder without rocking.

To achieve non-rocking contact it is possible, and has been proposed, to grind the end of the blocking ring to such shape as to mate exactly with the lens surface. This approach, however, is impractical and expensive in that it requires a large number of specially-shaped blocking rings to accommodate the various base curves and addition values associated with the complete progressive lens prescription range. Alternatively, a special blocking ring with three raised points on its perimeter could be used to provide three-point, non-rocking contact with the lens. These solutions, while technically feasible, are not very practical for the prescription laboratory, because the blocking apparatus is normally used for all lenses, and cannot be solely dedicated to the blocking of progressive lenses with aspherical distance portions.

SUMMARY OF THE INVENTION

The above discussed problems of the prior art are overcome or alleviated by the present invention. In accordance with the present invention, apparatus and a method are disclosed to address and solve the problem of blocking a progressive lens that has an aspherical distance portion.

In accordance with the present invention, a special "T" shaped shim is provided, which is pressed before blocking onto the distance portion of the lens, and the shim provides stable, three point contact with the standard cylindrical blocking ring. The shim is made of a flexible material such as vinyl. The shim should be as thin as possible to prevent leakage of the molten material (usually metal) from the space created between the lens and the blocking ring, consistent with the requirement that it be thick enough to compensate for the maximum asphericity of the lens. A thickness of approximately 0.35 mm is generally sufficient to compensate for the highest addition values of the lens, where the degree of asphericity is greatest. The shim has the general shape of an inverted "T". That is, it has the general shape of a "T", and it is mounted in an inverted position on the lens. The horizontal member of the T coincides with the 0°-180° of the lens, and the vertical member points toward the upper edge of the distance portion of the lens. The intersection point of the T coincides precisely with the distance fitting center. All three legs of the T must extend beyond the diameter of the blocking ring.

The two horizontal legs of the T need not be colinear. Instead their angles with the vertical leg may exceed 90°, for greater mechanical stability and uniformity of lens edge thickness.

BRIEF DESCRIPTION OF THE DRAWINGS:

Referring to the drawings, wherein like elements are numbered alike in the several FIGURES.

DESCRIPTION OF THE PREFERRED EMBODIMENT

Figure 1:
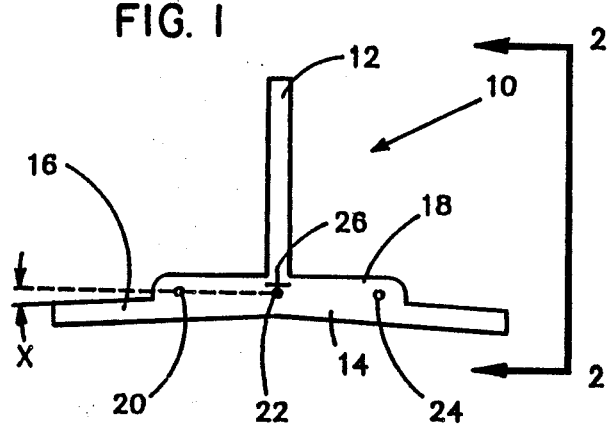
FIG. 1 is a front plan view of the shim of the present invention.
Figure 2:
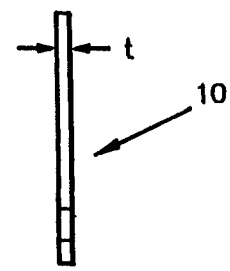
FIG. 2 is a side view of the shim along line 2—2 of FIG. 1.

Referring to FIG. 1, a front plan view of the shim 10 of the present invention is shown. Shim 10 is a generally "T" shaped member having a first portion 12 which might be referred to as a base member, and a cross member 14 made up of left and right segments 16 and 18. Each of the arms 16, 18 has an enlarged inboard segment adjacent to the base 12 and a smaller outboard segment. For purposes of convenience, base portion 12 might also be referred to as a vertical member and cross member 14 might be referred to as a horizontal member; but it will be understood that the shim is not limited to being used with those members in vertical and horizontal orientations. Shim 10 is shown in an inverted T position, since that is the general orientation in which it is to be mounted on a lens for processing of the lens. Shim 10 is made of a flexible material such as vinyl, and it has a thickness "t" (see FIG. 2) which is sufficient to compensate for the maximum asphericity of the lens on which it is to be mounted. Generally, a thickness "t" of about 0.35 mm will be sufficient for most cases.

Shim 10 has various alignment indicia thereon for aligning the shim on a lens. These alignment indicia include a series of three circles 20, 22, 24 which are arrayed on a straight line. The centers of circles 20, 22 and 24 are intended to lie on and align with the 0°-180° line (line 34) of the lens. The alignment indicia also include a "T" marking 26, the intersection point of which is intended to coincide precisely with the distance fitting center (36) of the lens.

Figure 3:
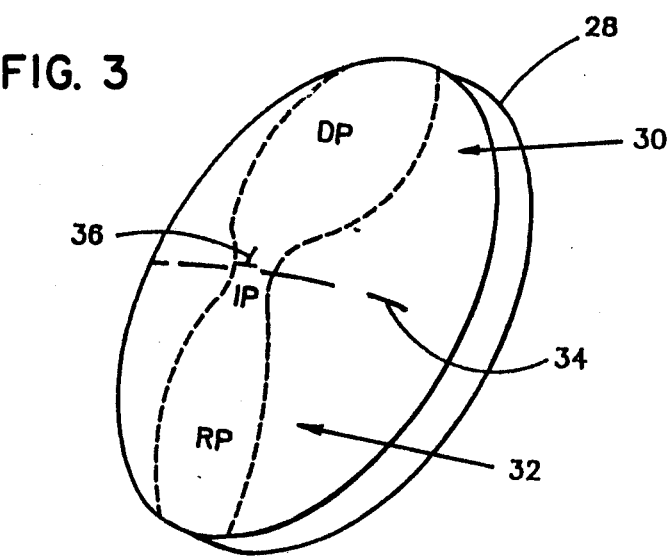
FIG. 3 is a perspective view of a progressive addition lens having an aspherical distance portion and on which the shim is to be mounted.

Referring to FIG. 3, a perspective view is shown of a progressive lens 28 prior to the lens being processed. As is well known in the art, lens 28 has an upper distance portion (DP) 30, a lower reading portion (RP) 32 and an intermediate portion (IP) therebetween. The preprocessing lens is marked with a 0°-180° line 34, and a "T" whose intersection point defines the distance fitting center. The line may also have other indicia for use in processing.

As indicated previously, the convex surface of a progressive lens may be aspherical in the distance portion, and this asphericity results in problems in mounting a block on the lens for processing of the lens. Specifically, the asphericity results in the block being unstable or rocking, so that it cannot be stably held against the convex surface of the lens for the purpose of securing the block to the lens (e.g., by a low melting point alloy, sometimes called low lead, as is well known in the art).

Figure 4:
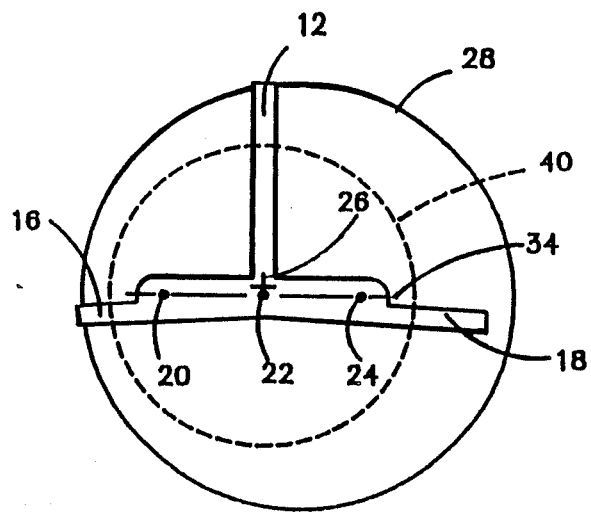
FIG. 4 is a plan view of a lens of FIG. 3 with the shim mounted thereon.

FIG. 4 shows the transparent shim 10 of the present invention mounted on the lens 28 in the distance portion of the lens. The circular indicia 20, 22, 24 on shim 10 are arrayed with their centers along 0°-180° line 34. The "T" indicia 26 on shim 10 precisely overlaps the "T" indicia 36 on the lens, so that the intersection of "T" indicia 26 is at the distance filling center of the lens. The circle 22 aligns with the vertical part of indicia 26 so that circle 22 is at the blocking center of the lens. The base member 12 of shim 10 extends toward the upper edge of the distance portion of the lens. The side of "T" 10 in contact with the convex surface of lens 28 is coated with a pressure sensitive releasable adhesive so that the shim can be adhered to the lens for use and then removed after the lens is processed. It should also be noted that to protect the convex surface of lens 10 from mechanical abuse, it is standard practice to cover the surface of the lens completely with a transparent protective tape prior to blocking. Blocking shim 10 is applied over, not under, such protective tape. The release adhesive on one side of shim 10 ensures adherence of the shim to the free side of the protective tape.

The phantom line 40 in FIG. 4 shows the position of the inner diameter of a blocking ring 38 (see FIG. 5) which would be mounted on lens 28 for processing of the lens. All three members of the shim T, i.e., base 12 and cross arms 16 and 18 extend outboard beyond the outer diameter of the blocking ring. Thus, when the block is placed on the shim, the inner diameter 42 of the block ring has three stable points of contact (i.e., base 12, arm 16 and arm 18), and the block does not rock. Accordingly, the block can be held stably on the lens while the block is adhered to the lens (e.g., by introducing the molten lead alloy into the block cavity. It will be noted that while the shim may space part of the blocking ring from the convex surface of the lens, the size of the gap and the viscosity and freezing characteristics of the molten lead alloy are such that the lead does not leak from under the block.

Figure 5:
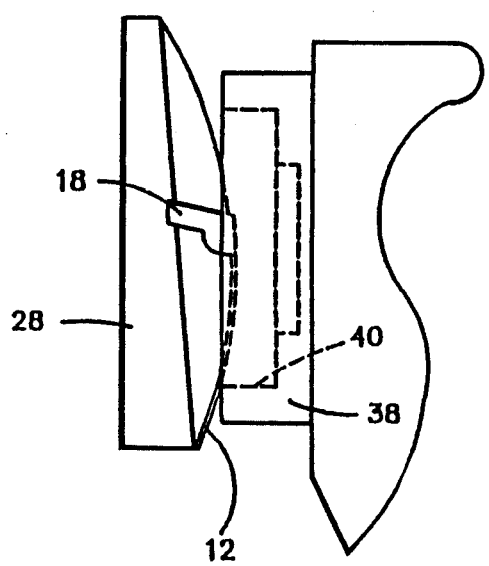
FIG. 5 shows a blocking ring mounted on the lens of FIGS. 3 and 4.

FIG. 5 shows, in side view, the distance portion of the lens 28, with the shim 10 applied thereto, pressed into three point contact with the inside diameter 40 of the cylindrical blocking ring 38 of an opthalmic lens blocking apparatus.

After processing of the lens is completed, the block is disengaged from the lens in a known manner. The shim 10 is then peeled off the convex surface of the lens, which is permitted by the release adhesive on the shim.

The arms 16 and 18 of shim 10 may be colinear. However, it is preferred that the arms be at an angle x to the horizontal and the 0°-180° line of the lens (which is aligned with distance fitting center 26, with the extensions from upper edges 16a and 18a intersecting at the center of circle 22. Configuring the shim 10 with the arms 16 and 18 at an angle x will result in extension of the arms below the distance portion of the lens; and that, in turn, makes it possible to achieve desired prismatic effects in generation, because the angle at which the lens is presented to the generating equipment will be determined by the angle x. For progressive lens made by applicants' assignee (the "OMNI" lens of American Optical Corporation) the preferred angle x has been determined to be 4°. If shim 10 is made of transparent material, the alignment indicia (e.g., circles 20, 22, 24 and T 26) may be printed on the shim. If the shim is made of opaque material, then the alignment indicia may be in the form of small alignment holes and slots punched through the shim.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A shim for mounting aspherical opthalmic lens on a blocking for processing, the shim including:
    a plastic element in the general shape of a "T" having a base member, whereby each of the members of the plastic element makes contact with the blocking ring to prevent rocking of said lens relative to said blocking ring and a pair of cross members; and
    alignment indicia means at a point of intersection of said base and cross members, said alignment indicia means being intended to be aligned with the distance fitting center of an aspherical opthalmic progressive lens to be processed.

2. The shim of claim 1 wherein:

said shim has a thickness greater than the maximum asphericity of the lens to be blocked and less than a value which would permit leakage between a block and the lens of molten material introduced into a block to bond the block to the lens.

3. The shim of claim 2 including:

alignment indicia means on each of said cross members.

4. The shim of claim 3 wherein:

said alignment indicia on said cross member are positioned to coincide with the 0°–180° line of said lens.

5. The shim of claim 4 wherein:

each of said cross members is inclined at a predetermined angle with respect to a straight line passing through a point aligned with said distance fitting center.

6. Apparatus for blocking an aspherical progressive opthalmic lens, the progressive lens to be blocked having a convex surface with a distance portion and a reading portion, including:

shim means for mounting on the convex surface of the lens in the distance portion of the lens, said shim means including a plastic element in the general shape of a "T" and having a base member and a pair of cross members;

alignment indicia means at a point of intersection of said base and cross members, said alignment indicia means being intended to be aligned with the distance fitting center of the aspherical opthalmic progressive lens to be processed; and blocking means for mounting on the lens in contact with the base and cross members of said shim means, said base and cross members extending beyond said blocking means whereby each of the members of the shim means makes contact with the blocking ring to prevent rocking of said lens relative to said blocking means.

7. The apparatus of claim 6 wherein:

said shim means has a thickness greater than the maximum asphericity of the lens and less than a value which would permit leakage between said lens and said blocking means of molten material introduced into said blocking means to bond said blocking means to said lens.

8. The apparatus of claim 7 including:

alignment indicia on each of said cross members of said shim means.

9. The apparatus of claim 8 wherein:

said alignment indicia on said cross member coincide with the 0°–180° line of the lens.

10. The apparatus of claim 9 wherein:

each of said cross members is inclined at a predetermined angle with respect to a straight line passing through a point aligned with the distance fitting center.

11. The shim of claim 1 wherein:

said plastic element has a pair of opposed first and second planar surfaces with said first surface having adhesive thereon and said second surface being free of adhesive, said first surface being intended to be adhered to the lens.

12. The apparatus of claim 6 wherein:

said plastic element has a pair of opposed first and second planar surfaces with said first surface having adhesive thereon and said second surface being free of adhesive, said first surface being intended to be adhered to the lens.

* * * * *